(12) United States Patent
Yezek et al.

(10) Patent No.: US 10,208,207 B2
(45) Date of Patent: Feb. 19, 2019

(54) ELECTROPHORETIC PARTICLES AND PROCESSES FOR THE PRODUCTION THEREOF

(71) Applicant: E INK CORPORATION, Billerica, MA (US)

(72) Inventors: Lee Yezek, Watertown, MA (US); Andrew Drabek, Cambridge, MA (US); Luke M. Slominski, Melrose, MA (US); Jennifer M. Morrison, Watertown, MA (US); Stephen J. Telfer, Arlington, MA (US); Brian Steinberg, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/600,730

(22) Filed: May 20, 2017

(65) Prior Publication Data

US 2017/0253742 A1   Sep. 7, 2017

Related U.S. Application Data

(62) Division of application No. 14/615,666, filed on Feb. 6, 2015, now Pat. No. 9,688,859.

(Continued)

(51) Int. Cl.
*H01B 1/00* (2006.01)
*C09B 48/00* (2006.01)
(Continued)

(52) U.S. Cl.
CPC .......... *C09B 48/00* (2013.01); *C09B 67/0013* (2013.01); *C09B 68/41* (2013.01);
(Continued)

(58) Field of Classification Search
CPC ...... C09B 48/00; C09B 67/0013; C09B 68/41; C09D 11/037; G02F 2001/1678; G03G 17/04; H01B 1/00
See application file for complete search history.

(56) References Cited

U.S. PATENT DOCUMENTS 4,285,801 A * 8/1981 Chiang ................. G03G 17/04
                                                      252/570
4,298,448 A   11/1981 Muller
(Continued)

FOREIGN PATENT DOCUMENTS

CN   101544850      9/2009
CN   102161735 A    8/2011
(Continued)

OTHER PUBLICATIONS

Kitamura, T. et al., "Electrical toner movement for electronic paper-like display", Asia Display/IDW '01, p. 1517, Paper HCS1-1 (2001) Jan. 1, 2001.

(Continued)

*Primary Examiner* — Mark Kopec
*Assistant Examiner* — Jaison P Thomas
(74) *Attorney, Agent, or Firm* — Antranig Baronian

(57) ABSTRACT

Polymer shells similar to those described in U.S. Pat. No. 6,822,782 can be formed on pigment particles by (a) physisorping a reagent comprising polymerizable groups on to the pigment particles by treating the particle with a reagent having a polymerizable or polymerization-initiating group, such that the reagent will not desorb from the particle surface when the particle is placed in a hydrocarbon medium; or (b) treating pigment particles bearing nucleophilic groups with a reagent having a polymerizable or polymerization-initiating group, and an electrophilic group, thus attaching the polymerizable or polymerization-initiating groups to the particle surface. The zeta potential of the (Continued)

pigment particles can be varied by a process similar to (b) but using a reagent which does not have a polymerizable or polymerization-initiating group.

10 Claims, 2 Drawing Sheets

Related U.S. Application Data

(60) Provisional application No. 61/936,393, filed on Feb. 6, 2014.

(51) Int. Cl.
   C09B 67/08    (2006.01)
   C09D 11/037   (2014.01)
   G03G 17/04    (2006.01)
   C09B 67/00    (2006.01)

(52) U.S. Cl.
   CPC .......... *C09D 11/037* (2013.01); *G03G 17/04* (2013.01); *H01B 1/00* (2013.01); *G02F 2001/1678* (2013.01)

(56) References Cited

U.S. PATENT DOCUMENTS

| | | | |
|---|---|---|---|
| 4,418,346 A | 11/1983 | Batchelder |
| 4,680,103 A | 7/1987 | Beilin |
| 4,891,245 A | 1/1990 | Micale |
| 5,360,689 A | 11/1994 | Hou |
| 5,498,674 A | 3/1996 | Hou |
| 5,725,651 A | 3/1998 | Zambounis |
| 5,783,614 A | 7/1998 | Chen |
| 5,872,552 A | 2/1999 | Gordon, II |
| 5,914,806 A | 6/1999 | Gordon, II |
| 5,961,804 A | 10/1999 | Jacobson |
| 6,017,584 A | 1/2000 | Albert |
| 6,117,368 A | 9/2000 | Hou |
| 6,120,588 A | 9/2000 | Jacobson |
| 6,120,839 A | 9/2000 | Comiskey |
| 6,130,774 A | 10/2000 | Albert |
| 6,144,361 A | 11/2000 | Gordon, II |
| 6,172,798 B1 | 1/2001 | Albert |
| 6,184,856 B1 | 2/2001 | Gordon, II |
| 6,225,971 B1 | 5/2001 | Gordon, II |
| 6,262,706 B1 | 7/2001 | Albert |
| 6,262,833 B1 | 7/2001 | Loxley |
| 6,271,823 B1 | 8/2001 | Gordon, II |
| 6,300,932 B1 | 10/2001 | Albert |
| 6,323,989 B1 | 11/2001 | Jacobson |
| 6,377,387 B1 | 4/2002 | Duthaler |
| 6,395,805 B1* | 5/2002 | Takao ................. C09B 67/0013 427/221 |
| 6,515,649 B1 | 2/2003 | Albert |
| 6,538,801 B2 | 3/2003 | Jacobson |
| 6,580,545 B2 | 6/2003 | Morrison |
| 6,652,075 B2 | 11/2003 | Jacobson |
| 6,672,921 B1 | 1/2004 | Liang |
| 6,693,620 B1 | 2/2004 | Herb |
| 6,721,083 B2 | 4/2004 | Jacobson |
| 6,727,881 B1 | 4/2004 | Albert |
| 6,788,449 B2 | 9/2004 | Liang |
| 6,822,782 B2 | 11/2004 | Honeyman |
| 6,866,760 B2 | 3/2005 | Paolini, Jr. |
| 6,870,661 B2 | 3/2005 | Pullen et al. |
| 6,922,276 B2 | 7/2005 | Zhang et al. |
| 6,982,178 B2 | 1/2006 | LeCain et al. |
| 7,002,728 B2 | 2/2006 | Pullen et al. |
| 7,012,600 B2 | 3/2006 | Zehner |
| 7,038,655 B2 | 5/2006 | Herb |
| 7,075,502 B1 | 7/2006 | Drzaic |
| 7,116,318 B2 | 10/2006 | Amundson et al. |
| 7,170,670 B2 | 1/2007 | Webber |
| 7,180,649 B2 | 2/2007 | Morrison et al. |
| 7,230,750 B2 | 6/2007 | Whitesides |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,247,379 B2 | 7/2007 | Pullen et al. |
| 7,312,784 B2 | 12/2007 | Baucom et al. |
| 7,312,916 B2 | 12/2007 | Pullen |
| 7,321,459 B2 | 1/2008 | Masuda et al. |
| 7,339,715 B2 | 3/2008 | Webber et al. |
| 7,375,875 B2 | 5/2008 | Whitesides |
| 7,411,719 B2 | 8/2008 | Paolini, Jr. et al. |
| 7,411,720 B2 | 8/2008 | Honeyman et al. |
| 7,453,445 B2 | 11/2008 | Amundson |
| 7,522,333 B2 | 4/2009 | Yamamoto et al. |
| 7,532,388 B2 | 5/2009 | Whitesides et al. |
| 7,535,624 B2 | 5/2009 | Amundson et al. |
| 7,679,814 B2 | 3/2010 | Paolini, Jr. et al. |
| 7,746,544 B2 | 6/2010 | Comiskey |
| 7,839,564 B2 | 11/2010 | Whitesides et al. |
| 7,848,006 B2 | 12/2010 | Wilcox |
| 7,903,319 B2 | 3/2011 | Honeyman |
| 8,009,348 B2 | 8/2011 | Zehner |
| 8,018,640 B2 | 9/2011 | Whitesides |
| 8,115,729 B2 | 2/2012 | Danner |
| 8,199,395 B2 | 6/2012 | Whitesides |
| 8,270,064 B2* | 9/2012 | Feick ................. C09C 1/00 345/107 |
| 8,283,397 B2 | 10/2012 | Terao et al. |
| 8,305,341 B2 | 11/2012 | Arango |
| 8,309,630 B2 | 11/2012 | Chun |
| 8,363,306 B2 | 1/2013 | Du |
| 8,390,918 B2 | 3/2013 | Wilcox |
| 8,462,423 B2 | 6/2013 | Farrand |
| 8,582,196 B2 | 11/2013 | Walls |
| 8,593,718 B2 | 11/2013 | Comiskey |
| 8,896,906 B2 | 11/2014 | Zhou et al. |
| 9,025,237 B2 | 5/2015 | Yokokawa et al. |
| 2003/0164480 A1* | 9/2003 | Wu ................. G02F 1/167 252/572 |
| 2005/0012980 A1 | 1/2005 | Wilcox |
| 2009/0009852 A1 | 1/2009 | Honeyman |
| 2009/0206499 A1 | 8/2009 | Whitesides |
| 2009/0225398 A1 | 9/2009 | Duthaler |
| 2010/0148385 A1 | 6/2010 | Balko |
| 2012/0118198 A1* | 5/2012 | Zhou ................. C09D 11/03 106/31.6 |
| 2012/0243073 A1* | 9/2012 | Takanashi ................. G02F 1/167 359/296 |
| 2012/0300284 A1* | 11/2012 | Zhou ................. C09D 11/033 359/296 |
| 2013/0244035 A1 | 9/2013 | Greinert et al. |
| 2013/0244149 A1 | 9/2013 | Wang |
| 2014/0332729 A1 | 11/2014 | Brochon et al. |
| 2014/0340430 A1 | 11/2014 | Telfer |
| 2015/0092262 A1 | 4/2015 | Greinert |
| 2015/0123049 A1 | 5/2015 | Farrand |
| 2015/0129818 A1 | 5/2015 | Blackman et al. |

FOREIGN PATENT DOCUMENTS

| | | |
|---|---|---|
| JP | S61118402 A | 6/1986 |
| JP | 2005097518 A | 4/2005 |
| JP | 2009031329 | 2/2009 |

OTHER PUBLICATIONS

Yamaguchi, Y. et al., "Toner display using insulative particles charged triboelectrically", Asia Display/IDW '01, p. 1729, Paper AMD4-4 (2001) Jan. 1, 2001.

Hye, K.G. et al., Preparation of Red Dyes Derived from Quinacridone Pigment . . . , Molecular Crystals and Liquid Crystals, 2012, 563(1), 36 (Abstract only) Aug. 2, 2012.

Wang, J. et al., Alkyl and Dendron Substituted Quinacridones: Synthesis, Structures and Luminescent Properties, J. Phys. Chem. B, 2007, 111, 5082 Apr. 18, 2007.

(56) References Cited

OTHER PUBLICATIONS

Korean Intellectual Property Office; PCT/US2015/014849; International Search Report and Written Opinion; dated Apr. 28, 2015. dated Apr. 28, 2015.
European Patent Office; EP Application No. 15746614.5; Extended European Search Report; dated Aug. 28, 2017.
Database WPI, Week 201252, Thompson Scientific, London, Great Britian; XP-002773030; Clarivate Analytics, (2017).

* cited by examiner

Fig. 3

ELECTROPHORETIC PARTICLES AND PROCESSES FOR THE PRODUCTION THEREOF

REFERENCE TO RELATED APPLICATIONS

This application is a divisional application and claims priority to and the benefit of copending application Ser. No. 14/615,666, filed Feb. 6, 2015, which claims the benefit of application Ser. No. 61/936,393, filed Feb. 6, 2014.

This application is also related to:
(a) U.S. Pat. No. 6,822,782;
(b) U.S. Pat. No. 7,411,720;
(c) U.S. Pat. No. 8,582,196;
(d) U.S. Patent Application Publication No. 2009/0009852 (now abandoned); and
(e) U.S. Patent Application Publication No. 2014/0340430.

The entire contents of these patents and applications, and of all other U.S. patents and published and copending applications mentioned below, are herein incorporated by reference.

BACKGROUND OF INVENTION

This invention relates to electrophoretic particles and processes for the production thereof. More specifically, this invention relates to surface modification of electrophoretic particles for the purpose, inter alia, of controlling the charges on the electrophoretic particles when they are present with other components typically present in electrophoretic media.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Electrophoretic displays have been the subject of intense research and development for a number of years. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,870,661; 7,002,728; 7,038,655; 7,170,670; 7,180,649; 7,230,750; 7,230,751; 7,236,290; 7,247,379; 7,312,916; 7,375,875; 7,411,720; 7,532,388; 7,679,814; 7,746,544; 7,848,006; 7,903,319; 8,018,640; 8,115,729; 8,199,395; 8,270,064; and 8,305,341; and U.S. Patent Applications Publication Nos. 2005/0012980; 2008/0266245; 2009/0009852; 2009/0206499; 2009/0225398; 2010/0148385; 2010/0207073; and 2011/0012825;
(b) Capsules, binders and encapsulation processes; see for example U.S. Pat. Nos. 6,922,276 and 7,411,719;
(c) Films and sub-assemblies containing electro-optic materials; see for example U.S. Pat. Nos. 6,982,178 and 7,839,564;
(d) Backplanes, adhesive layers and other auxiliary layers and methods used in displays; see for example U.S. Pat. Nos. 7,116,318 and 7,535,624;
(e) Color formation and color adjustment; see for example U.S. Pat. Nos. 7,075,502 and 7,839,564;
(f) Methods for driving displays; see for example U.S. Pat. Nos. 7,012,600 and 7,453,445;
(g) Applications of displays; see for example U.S. Pat. Nos. 7,312,784 and 8,009,348.

Known electrophoretic media, both encapsulated and unencapsulated, can be divided into two main types, referred to hereinafter for convenience as "single particle" and "dual particle" respectively. A single particle medium has only a single type of electrophoretic particle suspending in a colored fluid, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) The optical characteristic is typically color visible to the human eye, but may, alternatively or in addition, be any one of more of reflectivity, retroreflectivity, luminescence, fluorescence, phosphorescence, or color in the broader sense of meaning a difference in absorption or reflectance at non-visible wavelengths. When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the fluid (when the particles are adjacent the electrode remote from the observer, hereinafter called the "rear" electrode, so that the particles are hidden by the colored suspending medium).

A dual particle medium has two different types of particles differing in at least one optical characteristic and a fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If, however, the two types of particles have charges of the same polarity, but differ in electrophoretic mobility (this type of medium may hereinafter be referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid be sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described.

Some of the aforementioned patents and published applications disclose encapsulated electrophoretic media having three or more different types of particles within each capsule. For purposes of the present application, such multi-particle media are regarded as sub-species of dual particle media.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Electrophoretic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively. However, the service life of encapsulated electrophoretic displays, of both the single and dual particle types, is still lower than is altogether desirable. It appears (although this invention is in no way limited by any theory as to such matters) that this service life is limited by factors such as sticking of the electrophoretic particles to the capsule wall, and the tendency of particles to aggregate into clusters which prevent the particles completing the movements necessary for switching of the display between its optical states. In this regard, opposite charge dual particle electrophoretic displays pose a particularly difficult problem, since inherently oppositely charged particles in close proximity to one another will be electrostatically attracted to each other and will display a strong tendency to form stable aggregates. Experimentally, it has been found that if one attempts to produce a black/white encapsulated display of this type using untreated commercially available titania and carbon black pigments, the display either does not switch at all or has a service life so short as to be undesirable for commercial purposes.

It has long been known that the physical properties and surface characteristics of electrophoretic particles can be modified by adsorbing various materials on to the surfaces of the particles, or chemically bonding various materials to these surfaces. For example, U.S. Pat. No. 4,285,801 (Chiang) describes an electrophoretic display composition in which the particles are coated with a highly fluorinated polymer, which acts as a dispersant, and which is stated to prevent the particles from flocculating and to increase their electrophoretic sensitivity. U.S. Pat. No. 4,298,448 (Müller et al.) describes an electrophoretic medium in which the particles are coated with an organic material, such as a wax, which is solid at the operating temperature of the medium but which melts at a higher temperature. The coating serves to lower the density of the electrophoretic particles and is also stated to increase the uniformity of the charges thereon. U.S. Pat. No. 4,891,245 describes a process for producing particles for use in electrophoretic displays, wherein a heavy, solid pigment, preferred for its high contrast or refractive index properties, is coated with a polymeric material. This process significantly reduces the specific density of the resultant particle, and is stated to create particles with smooth polymer surfaces that can be chosen for stability in a given electrophoretic carrier fluid, and possess acceptable electrophoretic characteristics. U.S. Pat. No. 4,680,103 (Beilin Solomon I et al.) describes a single particle electrophoretic display using inorganic pigment particles coated with an organosilane derivative containing quaternary ammonium groups; this coating is stated to provide quick release of the particles from the electrode adjacent the observer and resistance to agglomeration.

Later, it was found that simple coating of the electrophoretic particles with the modifying material was not entirely satisfactory since a change in operating conditions might cause part or all of the modifying material to leave the surface of the particles, thereby causing undesirable changes in the electrophoretic properties of the particles; the modifying material might possibly deposit on other surfaces within the electrophoretic display, which could give rise to further problems. Accordingly, techniques have been developed for securing the modifying material to the surface of the particles.

For example, U.S. Pat. No. 5,783,614 (Chen et al.) describes an electrophoretic display using diarylide yellow pigment particles modified with a polymer of pentafluorostyrene. The modified particles are produced by forming a mixture of the unmodified particles, the pentafluorostyrene monomer and a free radical initiator, and heating and agitating this mixture so that the monomer polymerizes in situ on the surface of the particles.

U.S. Pat. No. 5,914,806 (Gordon II et al.) describes electrophoretic particle formed by reacting pigment particles with a pre-formed polymer so that the polymer becomes covalently bonded to the surface of the particles. This process is of course restricted to pigments and polymers having chemical properties which allow the necessary reaction to form the covalent bond. Furthermore, a polymer with only a few sites capable of reacting with the particle material has difficulty in reacting with the solid interface at the particle surface; this can be due to polymer chain conformation in solution, steric congestion at the particle surface, or slow reactions between the polymer and the surface. Often, these problems restrict such reactions to short polymer chains, and such short chains typically only have a small effect on particle stability in electrophoretic media.

It is also known to use, in electrophoretic displays, particles consisting essentially of polymer; if dark colored particles are required, the polymer particles can be stained with a heavy metal oxide. See, for example, U.S. Pat. Nos. 5,360,689; 5,498,674; and 6,117,368. Although forming the electrophoretic particles from a polymer allows close control over the chemical composition of the particles, such polymer particles usually have much lower opacity than particles formed from inorganic pigments.

The aforementioned U.S. Pat. No. 6,822,782 teaches that the stability of electrophoretic media can be improved by using as the electrophoretic particles pigment particles having from about 1 to about 15 percent by weight of the pigment of a polymer chemically bonded to, or cross-linked around, the pigment particles. These polymer-coated pigment particles are prepared by a process comprising (a) reacting the particle with a reagent having a functional group capable of reacting with, and bonding to, the particle, and also having a polymerizable or polymerization-initiating group, thereby causing the functional group to react with the particle surface and attach the polymerizable group thereto; and (b) reacting the product of step (a) with at least one monomer or oligomer under conditions effective to cause reaction between the polymerizable or polymerization-initiating group on the particle and the at least one monomer or oligomer, thereby causing the formation of polymer bonded to the particle. The preferred reagents for use in step (a) (the so-called "surface functionalization" step) of this process are silanes, especially trialkoxysilanes with polymerizable groups attached (e.g., 3-(trimethoxysilyl)propyl methacrylate; and (N-[3-(trimethoxysilyl)propyl]-N'-(4-vinylbenzyl)-ethylenediamine hydrochloride). The process using trialkoxysilanes in practice requires a vacuum drying stage to condense the silanols formed on the surface of the particles and to fully anchor the polymer shell to the bare pigment surface. The method works very well, but can result in pigments which are difficult to disperse to a consistent particle size after surface functionalization and prior to the polymerization step. In addition, the method may not be usable with certain organic pigments (the method relies upon the presence on the particle surface of hydroxyl or similar groups present on almost all inorganic pigments), and such organic pigments may be needed in full color electrophoretic displays. Furthermore, it has been found that it can be difficult to adjust the zeta potential of the coated pigment particles produced by this process; the zeta potentials of the coated pigments particles tend to be independent of the type of charging agent used in the electrophoretic medium, and the ability to control zeta potential may be important in securing optimum optical states from electrophoretic media.

Accordingly, this invention seeks to provide alternative methods for surface modification of pigments which can overcome the aforementioned disadvantages of the silane-based process described in the aforementioned U.S. Pat. No. 6,822,782.

SUMMARY OF INVENTION

Accordingly, in one aspect this invention provides a (first) process for treatment of pigment particles (especially inorganic pigment particles) by physi-sorption of a reagent comprising polymerizable groups on to the surfaces of the pigment particles by treating the particle with a solution of a reagent having a polymerizable or polymerization-initiating group, thereby causing the reagent to become physi-sorbed on to the particle surface such that the reagent will not desorb from the particle surface when the particle is placed in a hydrocarbon medium. This process may further comprise reacting the pigment particle with the reagent physi-sorbed thereon with at least one monomer or oligomer under conditions effective to cause reaction between the polymerizable or polymerization-initiating group on the particle and the at least one monomer or oligomer, thereby causing the formation of polymer on the particle. This process may hereinafter be called the "absorption" process of the invention.

In one form of this first process, the reagent may be dissolved in an ionic solvent or solvent mixture, such as a water/ethanol mixture. The process may include adjusting the pH of the solution of the reagent to control the charge on the pigment particle, and choosing the reagent to physi-sorb depending upon the charge on the particle. As is well known to those skilled in pigment chemistry, the charge on many pigment particles in ionic liquids depends upon the pH of the liquid, there typically being one pH (the isoelectric point) at which the particle is uncharged. Above the isoelectric point of the pigment, the pigment is negatively charged and the reagent may contain a quaternary ammonium salt grouping (much in the way organo-clays are prepared), while below the isoelectric point, the positively charged pigment surface can be modified by adsorption of reagents containing anionic functional groups. Reagents with quaternary ammonium salt groupings include: [3-(methacryloyloxy)ethyl]trimethylammonium chloride (MAETAC), [3-(methacryloyloxy)ethyl]trimethylammonium methyl sulfate, and [3-(methacryloylamino)propyl]trimethylammonium chloride. Reagents with anionic functional groups include 3-sulfopropyl methacrylate potassium salt (SPMK) and sodium 4-vinylbenzenesulfonate. The process is not restricted to pigments having inorganic oxide surfaces, and in principle may be extended to any pigments which can be charged sufficiently to promote adsorption of the functionalizing reagent. The reagent which is physi-sorbed on to the surface of the pigment particle should desirably be chosen so that it becomes essentially irreversibly bound to the particle in the low dielectric constant solvents (typically aliphatic hydrocarbons) used in the polymerization step and in the internal phase of the final electrophoretic display.

In another aspect, this invention provides a (second) process for treatment of pigment particles (which may be organic or inorganic pigment particles) bearing nucleophilic groups (for example, amine groups) on their surfaces by treatment of the pigment particles with a reagent having a polymerizable or polymerization-initiating group, and also comprising at least one electrophilic group. The electrophilic groups on the reagent react with the nucleophilic groups on the particle surfaces, thus attaching the polymerizable or polymerization-initiating groups to the particle surface. This process may further comprise reacting the pigment particle with the polymerizable or polymerization-initiating groups thereon with at least one monomer or oligomer under conditions effective to cause reaction between the polymerizable or polymerization-initiating group on the particle and the at least one monomer or oligomer, thereby causing the formation of polymer on the particle. This process may hereinafter be called the "nucleophilic" process of the invention.

The second process of the invention does not require a strongly nucleophilic group on the pigment particle, and may be used with organic pigments containing a nitrogenous ring, even when the nitrogen is not strongly basic. For example, the second process is useful with quinacridone dyes such as dimethyl quinacridone (IUPAC: 5,12-dihydro-3,10-dimethyl-quino[2,3-b]acridine-7,14-dione).

Reagents useful in this process include acid halides, such as 4-vinylbenzyl chloride and methacryloyl chloride, and 2-isocyanatoethyl methacrylate. Both benzylic halides and acid chlorides are very reactive with respect to nucleophilic substitution reactions. For example, the coupling reaction with 4-vinylbenzyl chloride results in a styrene group tethered to the surface.

The invention also provides a third process which is essentially a variant of the second process. Again, pigment particles (especially inorganic pigment particles) bearing nucleophilic groups on their surfaces are treated with a reagent having an electrophilic group but not bearing a polymerizable or polymerization-initiating group so that a residue of the reagent is chemically bonded to the pigment particle. The reagent is chosen so that the treatment of the pigment particle therewith affects the zeta potential of the pigment particle. The preferred reagents for use in this process are alkyl halides, especially benzyl chloride or bromide; these alkyl halides are especially useful for treating titania particles. Treatment with either benzyl chloride or bromide shifts the zeta potential of the pigment particle to more positive values.

The third process of the present invention can be carried out on pigment particles which have been silane-treated or had polymer formed thereon by any of the processes described in the aforementioned U.S. Pat. No. 6,822,782, or by the first or second processes of the present invention. Thus, the third process of the invention is easily adopted and beneficial because it does not require change in the functionalization or polymer-forming reactions on the pigment. It is believed (although the invention is in no way limited by this belief) that the third process of the invention serves to passivate the pigment surface (especially the inorganic, high energy metal oxide surface of many pigments used in electrophoretic displays) by covalent surface functionalization with an alkyl chain. Accordingly, the third process of the invention may hereinafter be referred to as the "passivation process" of the present invention.

This invention extends to an electrophoretic material comprising a plurality of electrically charged particles disposed in a fluid and capable of moving through the fluid under the influence of an electric field, wherein at least one of the particles is produced by a process of the present invention. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous. The invention also extends to an electrophoretic display comprising a layer of an electrophoretic material of the present invention and at least one electrode arranged to apply an electric field to the layer of electrophoretic material.

The displays of the present invention may be used in any application in which prior art electro-optic displays have been used. Thus, for example, the present displays may be used in electronic book readers, portable computers, tablet computers, cellular telephones, smart cards, signs, watches, shelf labels, variable transmission windows and flash drives.

BRIEF DESCRIPTION OF DRAWINGS

FIG. 3 is a graph, generally similar to that of FIG. 1, showing the variation of zeta potential with amount of charge control agent in experiments described in Example 8 below.

DETAILED DESCRIPTION

Figure 1:
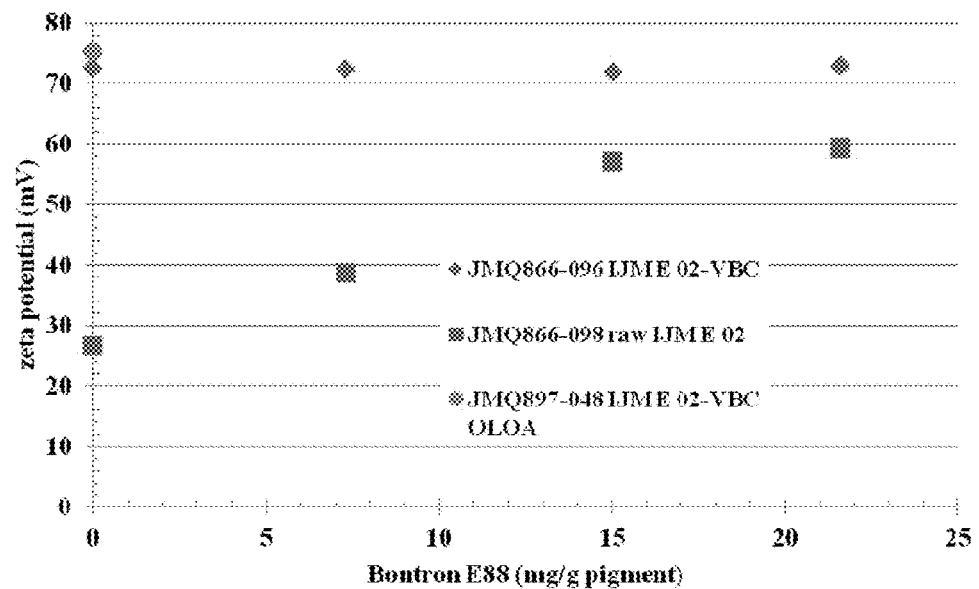
FIG. 1 of the accompanying drawings is a graph showing the variation of zeta potential with amount of charge control agent in experiments described in Example 6 below.

As indicated above, the present invention provides three different processes for treatment of pigment particles. Although these processes will mainly be described separately below, as already indicated, more than one process of the invention may be used in the synthesis of a single pigment particle; for example, a pigment particle which has been functionalized using either the first or second process of the invention may, before or after formation of polymer on the functionalized pigment, be treated with the third process of the invention.

Part A: Absorption Process of the Invention

As already mentioned, the absorption process of the present invention provides a process for treatment of pigment particles by physi-sorption of a reagent comprising polymerizable groups on to the surfaces of the pigment particles by treating the particle with a solution of a reagent having a polymerizable or polymerization-initiating group, thereby causing the reagent to become physi-sorbed on to the particle surface such that the reagent will not desorb from the particle surface when the particle is placed in a hydrocarbon medium. The absorption process avoids the vacuum drying step which, as previously mentioned, is normally required when pigment particles are functionalized with silanes, and provides a different surface chemistry which may lead to the ability to obtain pigments in zeta potential ranges which cannot be achieved by the processes described in the aforementioned U.S. Pat. No. 6,822,782. Elimination of the vacuum drying step is expected to improve the dispersion of the pigment at the polymerization stage and thereby reduce large aggregates in the resulting polymer-coated product. Experimentally it has been found that when the absorption process of the present invention is applied to a commercial silica/alumina coated titania, the proportion of polymer in the final polymer-coated pigment (as measured by thermogravimetric analysis) is similar to that is achieved after a silane functionalization, but the final polymer-coated pigment charges positively in electrophoretic media. This perhaps might be expected for cationic forms of the absorption process, but somewhat surprisingly has been found to be the case also for anionic forms.

The following Examples are now given, though by way of illustration only, to show details of particularly preferred reagents, conditions and techniques used in the absorption process of the present invention.

Example 1: Surface Modification Using Anionic Modifying Agents

The pigment being treated was dispersed at approximately 25% (by weight) in ethanol, and dilute hydrochloric acid was added to ensure the solution was well below the isoelectric point of the pigment. 3-Sulfopropyl methacrylate potassium salt (SPMK) (about 50-100 mg for each gram of pigment) was dissolved in water and added to the pigment dispersion. The solution is allowed to mix for several hours, then centrifuged and the solid residue washed twice with ethanol. The resulting pigment may be allowed to dry (this is not essential) and then dispersed into toluene for polymerization substantially as described in Example 28 of the aforementioned U.S. Pat. No. 6,822,782.

Example 2: Surface Modification Using Cationic Modifying Agents

The pigment being treated was dispersed at approximately 25% (by weight) in ethanol, and aqueous ammonia was added to ensure the solution was well above the isoelectric point of the pigment. [3-(Methacryloyloxy)ethyl]trimethylammonium chloride (MAETAC) (about 50-100 mg for each gram of pigment) was dissolved in water and added to the pigment dispersion. The solution is allowed to mix for several hours, then centrifuged and the solid residue washed twice with ethanol. The resulting pigment may be allowed to dry (this is not essential) and then dispersed into toluene for polymerization substantially as described in Example 28 of the aforementioned U.S. Pat. No. 6,822,782. If the pigment was not dried, a solvent switch procedure can be effected to yield a pigment dispersion in toluene.

Example 3: Analysis of Various Pigments Produced by the Absorption Process

Various pigments were treated by the absorption process of the invention with either SPMK or MAETAC as described in Examples 1 and 2 above, then washed, dispersed in toluene and a coating of poly(lauryl methacrylate) substantially as described in Example 28 of the aforementioned U.S. Pat. No. 6,822,782. The resultant polymer-coated pigments were tested by thermogravimetric analysis and suspended in Isopar E (a commercial hydrocarbon solvent) with the addition of 25 mg per gram of pigment of Solsperse 17K (a charge control agent), and their zeta potentials measured. The TGA values of the raw pigment, the functionalized pigment and the polymer-coated pigment are shown in Table 1 below.

TABLE 1

| Notebook # | Pigment | Surface Functionalization | TGA$_{raw}$ | TGA$_{sf}$ | TGA$_{poly}$ | ζ (mV) |
|---|---|---|---|---|---|---|
| 662-75-A | Dupont R-794 | MAETAC | 1.187% | 1.56% | 4.95% | +65.5 |
| 662-74-A | Dupont R-794 | SPMK | 1.187% | 1.55% | 6.78% | +46.3 |
| 662-60 | Shepherd Blue 385 | MAETAC | 0.623% | 2.01% | 5.61% | +85.8 |
| 662-72 | Shepherd Blue 385 | SPMK | 0.623% | 1.46% | 13.22% | +47.1 |
| 662-77 | Shepherd Blue 300591 | MAETAC | 0.476% | 1.87% | 9.78% | +80.3 |
| 662-76 | Shepherd Blue 300591 | SPMK | 0.476% | 0.75% | 9.03% | +14.7 |
| 662-61 | Shepherd Green 260 | MAETAC | 0.07% | 0.36% | 1.44% | +47 |

From the foregoing, it will be seen that functionalization of the pigments by the absorption process of the present invention produced final pigments have satisfactory amounts of polymer and good positive zeta potentials.

From the foregoing, it will be seen that the absorption process of the present invention can provide a simplification of the prior art silane functionalization process with elimination of a drying step. The process may also result better reproducibility in terms of the average particle size of the dispersion of functionalized pigment for the polymerization stage. Both effects would be potential cost savers, the former through process simplification, the latter by a potential yield increase.

Part B: Nucleophilic Process of the Invention

As already mentioned, the nucleophilic process of the present invention provides a process for treatment of pigment particles (which may be organic or inorganic pigment particles) bearing nucleophilic groups on their surfaces by treatment of the pigment particles by with a reagent having a polymerizable or polymerization-initiating group, and also comprising at least one electrophilic group. The electrophilic groups on the reagent react with the nucleophilic groups on the particle surfaces, thus attaching the polymerizable or polymerization-initiating groups to the particle surface.

The nucleophilic process of the present invention can produce organic pigment particles which are readily dispersed in the hydrocarbon fluids typically used in electrophoretic media. The process can also produce organic and inorganic pigments having zeta potentials which are substantially independent of the charge control agents used, and this constant zeta potential may contribute to improved optical states in electrophoretic displays.

The following Examples are now given, though by way of illustration only, to show details of particularly preferred reagents, conditions and techniques used in the nucleophilic process of the present invention.

Example 4: Nucleophilic Process Using Dimethyl Quinacridone

Dimethyl quinacridone (Ink Jet Magenta E 02, 15 g) and toluene (135 g) were mixed and subjected to a high performance disperser for 1 minute. The resultant dispersion was transferred to a round-bottomed flask equipped with a magnetic stir bar and the flask was placed into a preheated 42° C. silicone oil bath and placed under a nitrogen atmosphere. Triethylamine (12 mL, 86 mmole,) was added; after 1 hour 4-vinylbenzyl chloride (VBC, 5.0 mL, 36 mmole) was added by syringe in a single addition. The reaction mixture was then allowed to stir at 42° C. under a nitrogen atmosphere overnight.

The reaction mixture was poured into a plastic centrifuge bottle, diluted with toluene and centrifuged. The supernatant was decanted, the pigment washed with toluene, and the mixture again centrifuged. The washing procedure was repeated, then the supernatant was decanted and the treated pigment dried in a 70° C. vacuum oven overnight.

Example 5: Polymer Coating of Pigment Produced by Nucleophilic Process

The dried pigment from Example 4 above was ground with a mortar and pestle. A sample was removed for TGA and the remaining pigment was dispersed in toluene (10 wt % pigment dispersion) with sonication and rolling. The resultant pigment dispersion was transferred to a round-bottomed flask equipped with a magnetic stir bar and the flask was placed into a preheated 65° C. silicone oil bath. Lauryl methacrylate (20 g) was added to the reaction mixture, a Vigreux distilling column was attached as an air condenser, and the flask was purged with nitrogen for at least 1 hour. A solution of 2,2'-azobis(2-methylpropionitrile) (AIBN) in toluene (0.20 g AIBN in 5 mL toluene) was syringed into the reaction flask all at once, and the reaction mixture was stirred vigorously at 65° C. overnight.

The reaction mixture was then poured into a centrifuge bottle, diluted with toluene and centrifuged for 30 minutes; the supernatant was decanted and submitted for GPC analysis. The pigment was washed once with toluene and centrifuged for 30 minutes, then the supernatant was decanted and the pigment was dried in a 70° C. vacuum oven overnight.

Example 6: Testing of Polymer Coated Pigment

The polymer-coated pigment produced in Example 5 above was ground with a mortar and pestle, and it was dispersed to form a 20 wt % dispersion in Isopar E. This dispersion was sonicated and rolled for at least 24 hours, then filtered through a fabric mesh to remove any large particles. A sample of the dispersion was removed and its percent solid measured, and the dry pigment from that measurement was submitted for TGA and density by pycnometer. The TGA value for the treated pigment was 3.5%, whereas the raw pigment had a TGA value of 2.1%. The remaining dispersion was used to make 25 g of a 5% pigment dispersion with 0.5 g Solsperse 17000/g coated pigment for zeta potential measurement.

Samples of the dispersion thus prepared were mixed with varying amounts of Aluminum tris[3,5-di-tert-butylsalicylate], available commercially as Bontron E88, a very acidic charge control agent, and the zeta potential of the pigment measured. To provide controls, samples of the raw pigment (without the treatment with VBC and subsequent polymerization were similarly. The results are shown in FIG. 1 of the accompanying drawings. From the data in FIG. 1, it will be seen that the raw pigment exhibits a sharp rise in zeta potential with concentration of the acidic charge control agent, whereas the zero potential of the pigment produced by the nucleophilic process of the present invention is substantially insensitive to concentration of charge control agent. Interestingly, the zeta potential of the pigment of the invention in OLOA 371 (a very basic charge control agent) is essentially identical to that Solsperse, when both charge control agents were present in an amount of 0.5 g/g of pigment; that is, the zeta potential of the pigment of the present invention is essentially the same in the presence of either a basic (OLOA) or acidic (Solsperse 17k/Bontron) charge control agent. For comparison, a white titania pigment (prepared substantially as described in Example 28 of the aforementioned U.S. Pat. No. 6,822,782) dispersed with OLOA was much more negative than under similar conditions in the presence of Solsperse 17k, while the addition of small quantities of Bontron E88 had a dramatic effect on the zeta potential of this white pigment, moving it in the more positive direction.

Example 7: Additional Pigments Produced by Nucleophilic Process of the Invention Additional samples of Ink Jet Magenta E 02 and of other pigments were functionalized, polymer-coated and tested in the same manner as in Examples 4-6 above. The results are shown in Table 2 below, which also includes data for the raw pigments.

TABLE 2

| Pigment | CCA | Amount CCA | Zeta potential (mV) | Average particle size (nm) |
|---|---|---|---|---|
| Inkjet Mag EO2 (invention) | S17k | 0.5 g/g | 68.6 | 165 |
| Inkjet Mag EO2 (invention) | S17k | 0.5 g/g | 72.4 | 177 |
| Inkjet Mag EO2 (invention) | S17k | 0.5 g/g | 68.0 | 188 |
| Inkjet Mag EO2 (invention) | OLOA | 0.5 g/g | 84.5 | 203 |
| Inkjet Mag EO2 (invention) | OLOA | 0.5 g/g | 75.2 | 193 |
| Inkjet Mag EO2 Raw (control) | S17k | 0.5 g/g | 29.8 | 194 |
| Inkjet Yellow 4GC (control) | S17k | 0.53 g/g | −57.2 | 210 |
| Inkjet Yellow 4GC (invention) | S17k | 0.54 g/g | −10.3 | 100 |
| Inkjet Yellow H4G (control) | S17k | 0.54 g/g | −27.5 | 230 |
| Inkjet Yellow H4G (invention) | S17k | 0.54 g/g | −14.6 | 205 |
| PV Fast Yellow HG01 (control) | S17k | 0.55 g/g | 1.9 | 250 |
| PV Fast Yellow HG01 (invention) | S17k | 0.54 g/g | 10.9 | 162 |
| Toner Yellow HG (control) | S17k | 0.54 g/g | −8.1 | 234 |
| Toner Yellow HG (invention) | S17k | 0.54 g/g | 8.3 | 151 |

From the foregoing, it will be seen that the nucleophilic process of the present invention provides a process capable of functionalizing a wide variety of pigments to enable the formation of polymer coatings thereon; the process is especially useful for attachment of a polymer shell to organic pigments, which lack the silica or metal oxide surfaces common to many inorganic pigments and capable of reacting with silanes. The process is very simple and relies on well established chemistry in which the equilibrium strongly favors the coupled state so the yield of the nucleophilic reaction is essentially quantitative. The reagents used can be selected to be very reactive species which react readily with even weakly nucleophilic groups on the pigment particles. The nucleophilic groups on the pigments particles can be either part of the actual crystal structure of the pigment or can arise from an additive.

The ability of the nucleophilic process of the present invention to make the zeta potential of the polymer-coated pigment essentially independent of the choice of charging agent (as demonstrated in the Examples above) provides great latitude in the development on new electrophoretic internal phases, and has been shown to be of potential advantage in terms of optical states accessible with typical driving voltages and pulse lengths.

Part C: Passivation Process of the Invention

As already mentioned, the passivation process of the present invention provides a process in which pigment particles bearing nucleophilic groups on their surfaces are treated with a reagent having an electrophilic group but not bearing a polymerizable or polymerization-initiating group so that a residue of the reagent is chemically bonded to the pigment particle. The reagent is chosen so that the treatment of the pigment particle therewith affects the zeta potential of the pigment particle. The preferred reagents are typically alkyl halides (a term which is used herein to include aralkyl halides), especially benzyl chloride.

In prior art polymer-coated electrophoretic pigment particles which have been subjected to the silane/polymerization-treatment described above, in the final pigment particles the silane groups on the pigment particle surface having been found to be the dominant moieties for generating surface charge and zeta potential of the pigment. Thus, modification of pigment particle charging can be effected through incorporation of functional silanes and/or by incorporation of functional monomers in the polymer shell that change the inherent charge generation character of a pigment. However, varying the charging of the pigment particles by these two methods also affects other important pigment properties, such as dispersability in nonpolar solvents, polymer grafting density, and pigment dispersion viscosity. These highly interdependent properties make it difficult to vary a pigment's zeta potential without affecting other important properties. Accordingly, to allow optimization of various pigment properties independently of one another, it is desirable to synthesize a pigment with the appropriate silane and polymer shell and use post-polymerization modification of the pigment surface in accordance with the passivation process of the present invention in order to control zeta potential and thus electrophoretic mobility.

Figure 2:
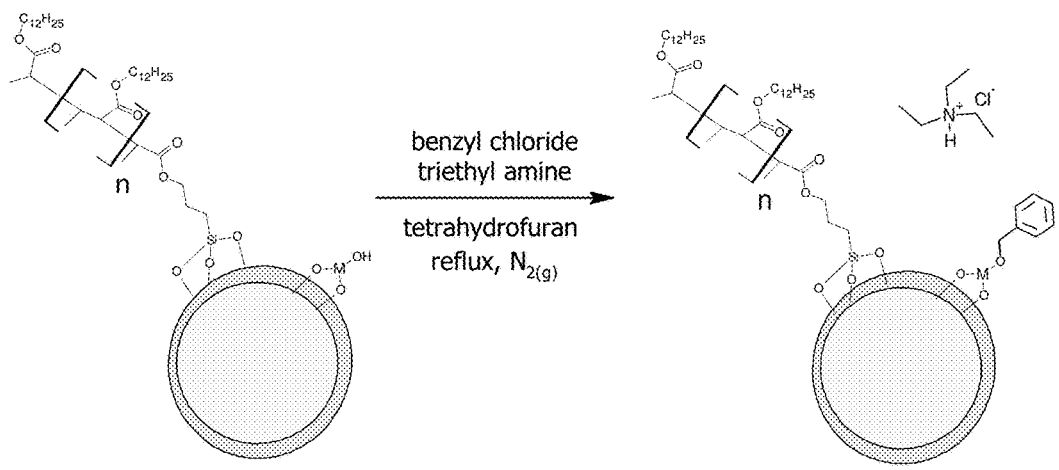
FIG. 2 is a reaction scheme of a passivation process of the present invention.

As already noted, the preferred reagents for use in the passivation process of the present invention are alkyl halides, especially benzyl chloride, preferably in the presence of triethylamine, as illustrated in FIG. 2 of the accompanying drawings. Typically, the benzyl chloride should be used in an amount of about 30 molecules per square nanometer of pigment surface, which is estimated to be about a fivefold excess relative to the nucleophilic hydroxyl groups available on a typical metal oxide pigment surface; the extent of benzylation may be inferred through the shift in the maximum zeta potential of the pigment. Pigment zeta potential is typically determined in Isopar E with the charge control agent Solsperse 17000; the zeta potential shift increases with increasing reactivity for the alkylation reaction, and such increased reactivity can be achieved through increasing the reaction temperature or time, solvent polarity, and strength or hindrance of the non-nucleophilic base. Typical positive zeta shift magnitudes range from a net +10 to +60 mV. Recommended alkylation conditions for reaction with benzyl chloride are a slightly polar organic solvent (toluene or tetrahydrofuran) in the presence of a non-nucleophilic organic base (triethylamine or diisopropylethylamine) at about 66° C. The reaction can be performed immediately treatment of the raw pigment with silane or after polymer coating.

For example, in one series of experiments a raw silica/alumina coated titania pigment (R794 sold by du Pont) was found to have a weight loss of 1.08% during TGA. After treatment with vinylbenzylchloride (VBC, an electrophile similar to benzyl chloride) in the presence of triethylamine, the weight loss increased to 1.23%, corresponding to the addition of 1.03 alkyl group per square nanometer of pigment surface. Subsequent polymerization of the VBC treated pigment with lauryl methacrylate increased weight loss to 3.90%. This subsequent grafting of polymer to the VBC-treated titania verifies the covalent surface-functionalization of the metal oxide.

The passivation process of the present invention works through the modification of pigment zeta potential through covalent attachment of alkyl (or other) groups to the pigment surface. The attachment of benzyl groups to the surface of white titania pigments with inherently negative zeta potential values before modification serves to shift the zeta potential to a more positive value. The functionality attached to the electrophilic alkyl group will serve to determine the sign and magnitude of the zeta potential modification. Using 4-fluorobenzylchloride or 4-nitrobenzylchloride will tend to induce a more negative zeta potential through fluorinated and acidic surface-functionalization. Conversely, alkylation with basic alkyl groups like 4-(chloromethyl)pyridine or 4-(dimethylamino)benzoyl chloride would modify the zeta potential to more robust positive values. Finally, incorporation of tert-butyl benzyl chloride or long chain alkyl halides like 1-bromooctane could be useful to provide additional steric hindrance to exclude diffusion of molecules to the pigment surface.

The following Examples are now given, though by way of illustration only, to show details of particularly preferred reagents, conditions and techniques used in the passivation process of the present invention.

Example 8: Passivation Process of the Invention Applied to Spinel-Based Black Pigment This Example reports the results of preliminary experiments in which a spinel-based polymer-coated black pigment was treated with benzyl chloride and benzyl bromide to test the hypothesis that amine groups present in the pigment could be quaternized and hence permanently positively charged, thus producing a pigment which is insensitive to the choice of charging agent.

A polymer-coated black pigment based on Shepherd BK444 and produced substantially as described in Example 1 of U.S. Pat. No. 8,270,064 was treated with benzyl chloride in substantially the same manner as in Example 4 above except that the reaction was conducted in Isopar E. The polymer-coated black pigment (24 g), benzyl chloride (4 g), triethylamine (4.7 g) and Isopar E were mixed at room temperature for 24 hours. The resultant modified pigment was repeatedly centrifuged and washed with Isopar E. Dispersions of the pigment were made with Bontron E88 and variable amounts of OLOA 371, and their zeta potentials measured. To provide controls, similar dispersions of the untreated polymer-coated black pigment were prepared and their zeta potentials measured. The results are shown in FIG. 3.

Figure 3:
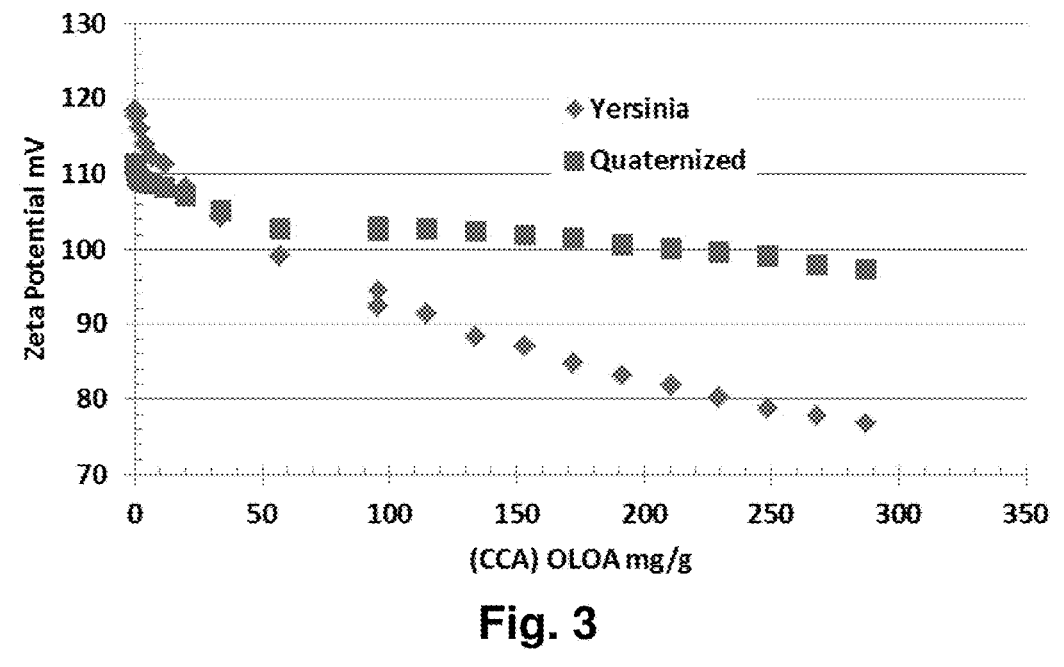

From FIG. 3 it will be seen that the alkylated pigment is much less sensitive to the presence of OLOA than the non-alkylated pigment and yields a nearly constant surface charge.

Example 9: Passivation Process of the Invention Applied to Titania-Based White Pigments Several titania-based white pigments were treated with benzyl chloride either after silane functionalization or after formation of polymer on the pigment. Both the raw and the treated pigments were tested by TGA, and their maximum zeta potentials were measured in Isopar-E. The results are shown in Table 3 below.

The procedure used for treatment with benzyl chloride after formation of a polymer layer on the white pigment was as follows. The pigment (300 g) was added to a 1 L plastic bottle to which tetrahydrofuran (THF—500 mL) was also added. The plastic bottle was rolled on a roll mill and then sonicated. The resultant dispersion was placed in a jacketed reactor equipped with a four-necked reactor top equipped with an overhead mechanical stirrer, a condenser capped with a nitrogen gas inlet, a thermometer or thermocouple and a septum. The dispersion was rinsed into the reactor with a small amount of THF and heated to reflux and stirred vigorously. The headspace of the reactor was purged with nitrogen and kept under positive pressure of nitrogen for the remaining stages of the reaction. Triethylamine was added by syringe to the reactor and the resultant mixture stirred for 30 minutes, then benzyl chloride was added by syringe to the reactor, and the resultant reaction mixture stirred overnight at reflux. To isolate the product, the reactor was drained into two 1 L centrifuge bottles and the dispersion diluted to 1000 g total solvent and then centrifuged. The supernatant was decanted and the pigment redispersed by rolling with 1000 g total THF for 90 minute on a roll mill, after which the pigment dispersion was again centrifuged and the supernatant decanted. The wet pigment pack was then dried at 70° C. overnight in a vacuum oven.

TABLE 3

| Pigment No. | Pigment Base | Surface Treatment | TGA/washTGA | Zeta Potential Max |
|---|---|---|---|---|
| 1 | Essentially as U.S. Pat. No. 6,822,782, Example 28, Part A | None | 1.98%/1.73% | Nd |
| 2 | As Pigment 1 | Benzyl chloride, triethylamine | 1.87%/1.81% | Nd |
| 3 | As Pigment 2 after benzyl chloride treatment | Poly(lauryl methacrylate) | 9.22%/9.16% | −3.4 mV |
| 4 | As Pigment 1 (with process modifications) | None | 8.69%/7.87% | −56 mV |
| 5 | As Pigment 4. | BzCl, TEA | 7.56%/7.91% | −25 mV |

TABLE 3-continued

| Pigment No. | Pigment Base | Surface Treatment | TGA/washTGA | Zeta Potential Max |
|---|---|---|---|---|
| 6 | Essentially as U.S. Pat. No. 8,582,196, Example 1 | None | 8.93%/7.77% | −91 mV |
| 7 | As Pigment 6 | BzCl, TEA | 7.43%/7.77% | −52 mV |
| 8 | As Pigment 6 | BzCl, TEA | 7.63%/7.77% | −11 mV |

Following the various surface modifications, Pigments 6 and 7 were converted into experimental single pixel displays as described in U.S. Pat. No. 8,582,196, Example 2 using the same spinel-based black pigment there described, and the resultant experimental displays were subjected to electro-optical tests as described in Example 3 of this patent. The results are shown in Table 4 below. Prior to the electro-optical tests, the single pixel displays were switched repeatedly to their extreme black and white states, then finally switched to black or white, and the $L^*$ value measured 3 seconds after the end of the final drive pulse to allow transient effects to dissipate. The image stability figures are measured by allowing the display to remain in a black or white extreme state for a dwell time of 10 seconds, driving it to its opposite optical state, measuring the $L^*$ value of this state immediately (20 milliseconds) after the end of the drive pulse and 30 seconds later, and taking the difference. The DSD (dwell state dependency) values are similarly measured by allowing the display to remain in a black or white extreme state for a dwell time of 20 seconds, driving it to its opposite optical state, measuring the $L^*$ value of this state immediately after the end of the drive pulse and 30 seconds later, and taking the difference.

TABLE 4

| Pigment | $L^*$ WS | $L^*$ DS | WS is | DS is | WS DSD | DS DSD | Formulation W:K Ratio wt % | White/Black Pigment wt % |
|---|---|---|---|---|---|---|---|---|
| 6 (no surface treatment) | 73.9 | 21.2 | 0.0 | −3.3 | 0.8 | 1.4 | 4.8:1 47.5% | 39.25/8.2 |
| 6 (no surface treatment) | 75.1 | 22.3 | 0.0 | −4.0 | 0.7 | 2.7 | 6.1:1 47.5% | 40.8/6.7 |
| 6 (no surface treatment) | 73.3 | 25.8 | 0.1 | −1.9 | 0.2 | 9.0 | 8.5:1 47.5% wt | 42.5/5.0 |
| 7 (BzCl surface treatment) | 72.3 | 16.0 | 0.2 | −1.0 | −0.3 | 2.9 | 4.8:1 47.5% | 39.25/8.2 |
| 7 (BzCl surface treatment) | 73.9 | 18.0 | 0.1 | −1.4 | −0.5 | 5.1 | 6.1:1 47.5% | 40.8/6.7 |
| 7 (BzCl surface treatment) | 74.9 | 24.1 | 0.0 | −2.2 | 0.1 | 5.0 | 8.5:1 47.5% | 42.5/5.0 |

From the data in Table 4, it will be seen that the benzyl chloride surface treatment did not significantly affect the white state of the displays (the change following the benzyl chloride treatment is not more than 1-2 $L^*$) but did result in a substantial decrease (about 5 $L^*$) in the $L^*$ value of the dark state; thus, the benzyl chloride treatment produced a useful increase (about 3-4 $L^*$) in the dynamic range of the displays. Statistical analysis indicates no significant changes in image stability and DSD data between the untreated and the benzyl-treated pigments.

From the foregoing, it will be seen that the passivation process of the present invention allows surface functionalization of pigment particles, and consequent modification of pigment zeta potential, through covalent attachment of alkyl groups to the pigment surface. Specifically, benzyl group attachment to the surface of white pigments with inherently negative zeta potential values before modification serves to shift their zeta potential to a more positive value. Although this is demonstrated above for titania-based white pigments, it may reasonably be assumed to apply to any inorganic pigment with a nucleophilic metal oxide surface. The sign and magnitude of the zeta potential modification may be controlled by functional groups attached with an electrophilic alkyl group. For example, 4-fluorobenzyl chloride and 4-nitrobenzyl chloride should induce a more negative zeta potential, since fluorinated and acidic surface-functionalization are documented to effect zeta potential modification of colloids in nonpolar liquids. Conversely, alkylation with basic alkyl groups such 4-(chloromethyl)pyridine or 4-(dimethylamino)benzoyl chloride would serve to modify zeta potential to more positive values. Finally, treatment with tert-butyl benzyl chloride or long chain alkyl halides, such as 1-bromooctane may be useful to provide additional steric hindrance to exclude diffusion of molecules to the pigment surface.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A process for treatment of pigment particles, the process comprising physi-sorping a reagent comprising polymerizable groups on to the surfaces of the pigment particles by treating the particle with a solution of a reagent having a polymerizable or polymerization-initiating group, thereby causing the reagent to become physi-sorbed on to the particle surface such that the reagent will not desorb from the particle surface when the particle is placed in a hydrocarbon medium,
    wherein the pigment is negatively charged and the reagent contains a quaternary ammonium salt.

2. A process according to claim 1 wherein the pigment particle comprises an inorganic pigment.

3. A process according to claim 1 further comprising reacting the pigment particle with the reagent physi-sorbed thereon with at least one monomer or oligomer under conditions effective to cause reaction between the polymerizable or polymerization-initiating group on the particle and the at least one monomer or oligomer, thereby causing the formation of polymer on the particle.

4. A process according to claim 1 wherein the quaternary ammonium salt comprises at least one of [3-(methacryloyloxy)ethyl]trimethylammonium chloride, [3-(methacryloyloxy)-ethyl]trimethylammonium methyl sulfate, and [3-(methacryloylamino)-propyl]trimethylammonium chloride.

5. An electrophoretic material comprising a plurality of electrically charged particles disposed in a fluid and capable of moving through the fluid under the influence of an electric field, wherein at least one of the charged particles is produced by the process of claim 1.

6. A process for treatment of pigment particles, the process comprising physi-sorping a reagent comprising polymerizable groups on to the surfaces of the pigment particles by treating the particle with a solution of a reagent having a polymerizable or polymerization-initiating group, thereby causing the reagent to become physi-sorbed on to the particle surface such that the reagent will not desorb from the particle surface when the particle is placed in a hydrocarbon medium,
    wherein the pigment is positively charged and the reagent contains an anionic functional group.

7. A process according to claim 6 wherein the reagent comprises at least one of 3-sulfopropyl methacrylate potassium salt and sodium 4-vinylbenzenesulfonate.

8. A process according to claim 6 wherein the pigment particle comprises an inorganic pigment.

9. A process according to claim 6 further comprising reacting the pigment particle with the reagent physi-sorbed thereon with at least one monomer or oligomer under conditions effective to cause reaction between the polymerizable or polymerization-initiating group on the particle and the at least one monomer or oligomer, thereby causing the formation of polymer on the particle.

10. An electrophoretic material comprising a plurality of electrically charged particles disposed in a fluid and capable of moving through the fluid under the influence of an electric field, wherein at least one of the charged particles is produced by the process of claim 6.

* * * * *